July 29, 1952  B. McFALL  2,604,774
BICYCLE LOCK

Filed July 12, 1949  3 Sheets-Sheet 1

INVENTOR.
Bruce McFall
BY *Victor J. Evans & Co.*
ATTORNEYS

July 29, 1952
B. McFALL
2,604,774
BICYCLE LOCK
Filed July 12, 1949
3 Sheets-Sheet 2
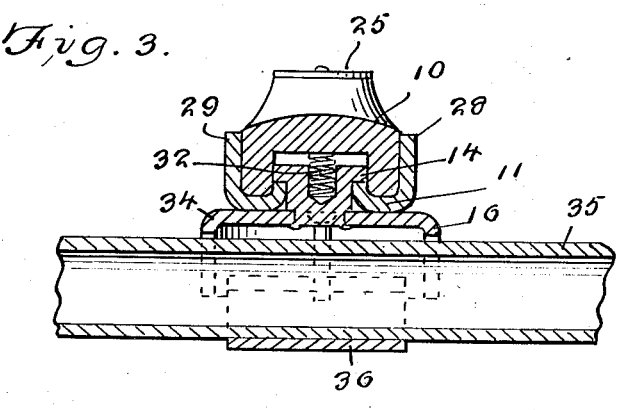
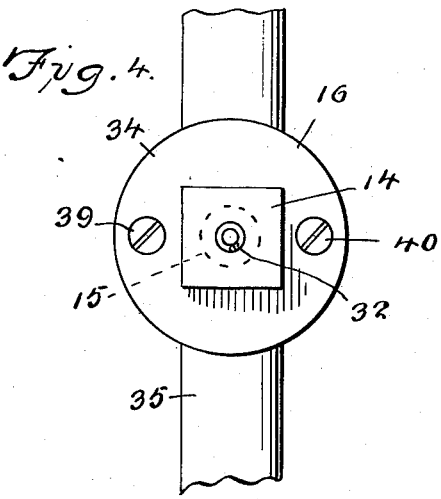
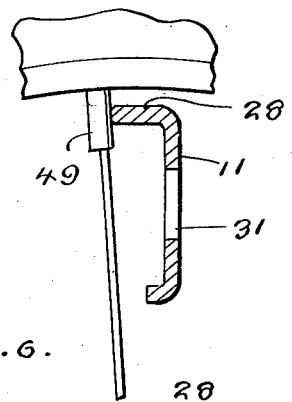
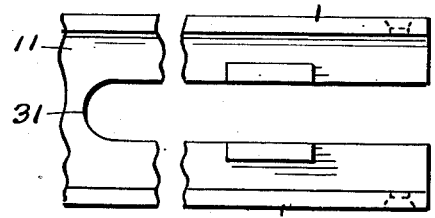
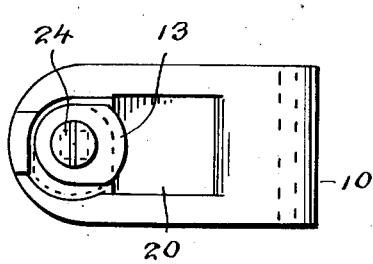
INVENTOR.
Bruce McFall
BY Victor J. Evans & Co.
ATTORNEYS July 29, 1952
B. McFALL
2,604,774
BICYCLE LOCK
Filed July 12, 1949
3 Sheets-Sheet 3
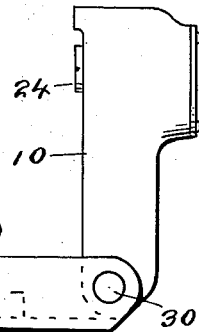
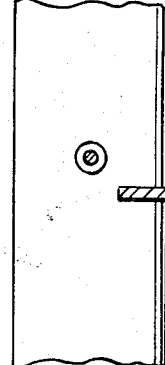
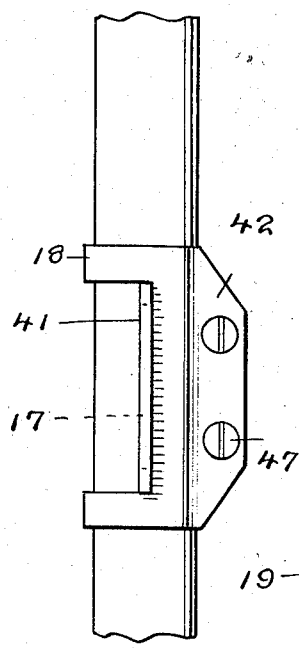
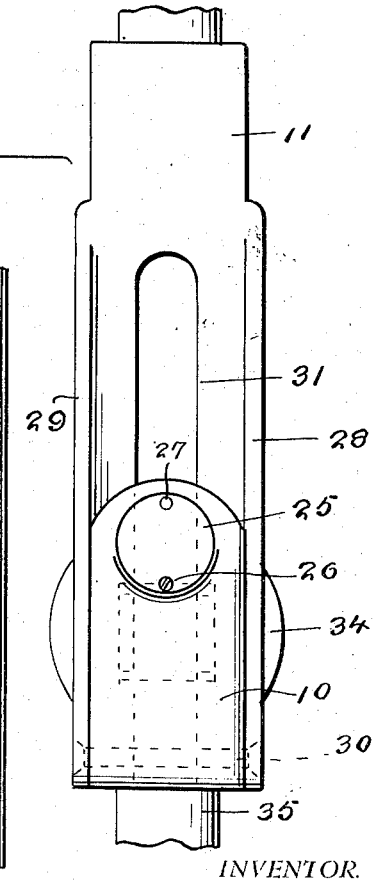
INVENTOR.
Bruce McFall
BY Victor J. Evans & Co.
ATTORNEYS Patented July 29, 1952

2,604,774

UNITED STATES PATENT OFFICE 2,604,774

BICYCLE LOCK

Bruce McFall, Johnson City, Tenn.

Application July 12, 1949, Serial No. 104,350

2 Claims. (Cl. 70—227)

This invention relates to locks for bicycles and the like particularly of the type that extend through the spokes of a wheel, and in particular a lock element pivotally and slidably mounted on a bar of the frame of the bicycle and having a tongue which, in the locking position, extends through a wheel with the extended end thereof loosely held in a socket on a bar of the frame positioned on the opposite side of the wheel.

The purpose of this invention is to provide a bicycle lock that remains permanently attached to the bicycle and that locks the bicycle through a wheel and positively prevents turning of the wheel.

With the usual type of bicycle lock, even with an extended U-shaped bolt or bail it is difficult to insert parts of the lock through a wheel so that the lock positively engages bars of the frame on both sides of the wheel. With this thought in mind this invention contemplates a bicycle lock including a tongue that extends through a wheel, between the spokes thereof for engagement with a socket on a bar on the opposite side of the wheel wherein the tongue may be withdrawn and turned to a position aligned with a bar on which it is mounted so that the bicycle may be unlocked and used without removing the lock from the frame.

The object of this invention is, therefore, to provide an improved bicycle lock that is formed with clamping elements permanently secured to bars of the bicycle frame on opposite sides of a wheel thereof and wherein a tongue with a cylinder lock incorporated therein is slidably and pivotally mounted on one of the clamps and positioned to coact with the other clamp in the locking position.

Another object of the invention is to provide a bicycle lock that may readily be mounted on the usual type of bicycle.

A further object of the invention is to provide an improved bicycle lock which is of a simple and economical construction.

With these and other objects and advantages in view the invention embodies a clamp positioned on a bar of a bicycle frame and having a stud, T-shaped in cross section positioned in a socket of a base having a tongue extended therefrom, with a locking element for securing the base on the stud, and with a socket positioned on the bar of the frame on the opposite side of the wheel for receiving an extended end of the tongue.

Other features and advantages of the invention will appear from the following description taken in connection with the drawings wherein:

Figure 3 is a cross section through the base of the lock taken on line 3—3 of Figure 2.

Figure 4 is a plan view of a clamp on which the base of a lock is positioned, the lock being omitted and the ends of the bars of the frame being broken away.

Figure 5 is a view looking toward the under surface of the base of the lock with the tongue and other parts of the lock omitted and taken on line 5—5 of Figure 2.

Figure 6 is a detail illustrating the inner surface of the top of the lock.

Figure 7 is a plan view showing the lock in the open position and with parts broken away and shown in section.

Figure 8 is an elevational view illustrating the position of the lock with the wheel free and with the lock tongue rotated to a position aligned with the bar of the frame on which the lock is mounted.

Figure 9 is a detail illustrating the position of the tongue of the lock in a wheel wherein a flange on the upper edge of the tongue engages the adjusting nut of a spoke of the wheel, the tongue being shown in section.

Figure 1:
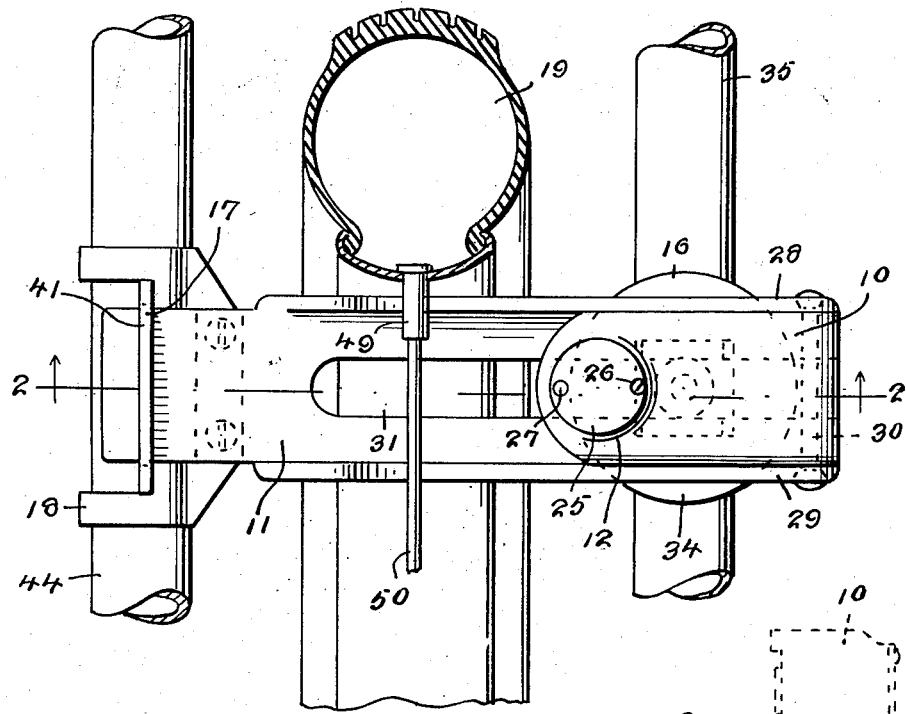
Figure 1 is a front elevational view of the lock with the lock in the locking position and with parts thereof mounted on bars of a bicycle frame on opposite sides of a wheel and in which the wheel is shown in section.

Referring now to the drawings wherein like reference characters denote corresponding parts the bicycle lock of this invention includes a base or block 10 pivotally mounted on the end of an elongated plate providing a tongue 11 with a lock cylinder 12 incorporated in the base and provided with a lock bolt 13 that is positioned to extend under a head 14 of a stud 15 on a clamp 16, and the tongue is positioned to extend through a socket 17 of a clamp 18 positioned on the bar of the frame on the opposite side of a wheel 19.

Figure 2:
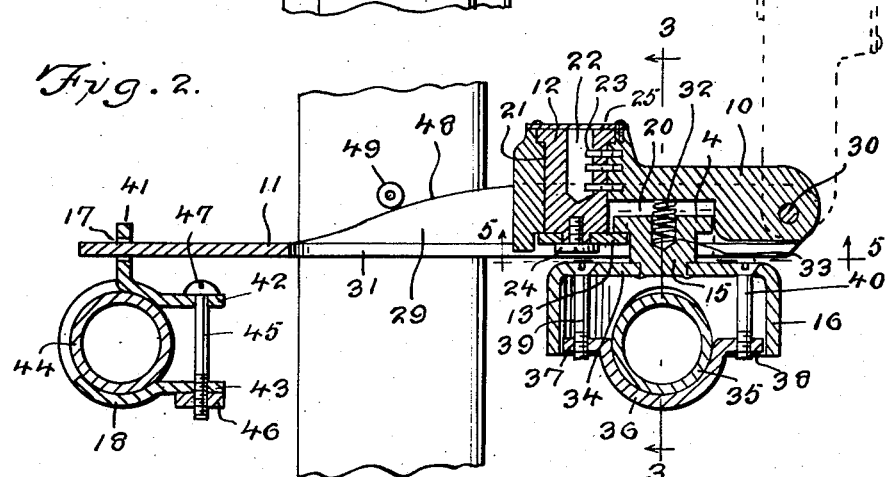
Figure 2 is a sectional plan through the lock taken on line 2—2 of Figure 1.

The base 10 is provided with a socket 20 which receives the head 14 of the stud 15 and also a cylindrical opening 21 in which the lock cylinder 12 is positioned, as shown in Figure 2. The lock cylinder is provided with a key slot 22 into which pins 23 that extend through the cylinder and into the base 10, are positioned. The lock bolt 13 is secured to the inner end of the cylinder 12 by a screw 24 which also secures the cylinder in the opening of the base 10. The base 10 is also provided with a cover plate 25 that is positioned to cover the end of the lock cylinder to prevent dirt, and the like, entering the key slot, and the cover plate is pivotally mounted on the base by a pin 26 and the opposite side is provided with a knob 27 by which it may be actuated to a position at one side of a base when it is desired to insert a key in the key slot.

The base 10 is pivotally mounted between flanges 28 and 29 of the tongue 11 by a pin 30 and with the parts assembled, as illustrated in Figure 2 wherein the lock bolt 13 is extended under the head 14 of the stud 15 the tongue 11 will be retained with the outer end in the slot 17 of the clamp 18. The tongue 11 is provided with an elongated slot 31 and with the lock turned to the open position the base is pivoted outwardly to the position illustrated in dotted lines in Figure 2 and as shown in full lines in Figure 7, and with the parts in this position the tongue 11 is slid over the stud 15 with the stud traveling in the slot 31 and when the tongue is withdrawn to the extreme position it is turned upwardly to the position shown in Figure 8 wherein the base is replaced over the head of the stud and the lock bolt turned to the locking position for securing the lock in the unlocked or open position, as illustrated in Figure 8.

A spring 32 is provided in a socket 33 in the head of the stud 15 for resiliently urging the base away from the tongue and stud when the lock is released.

The stud 15 is mounted in a circular base 34 of a clamp 16 and the clamp is secured to a bar 35 of a bicycle frame by a clamp 36 having extended ends 37 and 38 which are secured in the clamp 16 by bolts 39 and 40, respectively. The heads of the bolts are positioned in the part 34 of the clamp so that they are covered by the tongue and base when the lock elements are in the locking position.

The clamp 18 is provided with an outwardly extended tongue 41 in which the socket 17 is positioned and this clamp is provided with flanges 42 and 43 by which it is clamped around a bar 44 of a bicycle frame by a bolt 45 with a nut 46 thereon. The head 47 of the bolt 45 is positioned under the tongue 11 with the locking elements in the locking position whereby it is inaccessible when the lock is locked.

As illustrated in Figures 2 and 9 the flange 28 of the tongue 11 is provided with an arcuate surface 48 that is positioned to engage a hub or adjusting nut 49 of a spoke 50 to prevent turning of the wheel with the lock part in the locked position.

With the parts arranged in this manner the clamps 16 and 18 may be permanently mounted on the bars at the sides of the bicycle wheel and when it is desired to lock the bicycle the tongue 11 is extended between the spokes with the end thereof in the socket 17 of the clamp 18. With the parts in this position the lock cylinder is turned to the locking position and the plate 25 moved to the position as illustrated in Figure 1. To unlock the lock the plate 25 is slid toward one side, the lock cylinder turned so that the lock bolt 13 disengages the head 14 of the stud 15. The base 10 is then opened to the position shown in dotted lines in Figure 2 and the tongue slid outwardly as shown in Figure 7. The tongue with the base thereon may then be turned upwardly as shown in Figure 8 and the tongue with the base secured therein locked in this position.

It will be understood that modifications may be made in the parts without departing from the spirit of the invention.

What is claimed is:

1. A bicycle lock comprising an elongate plate having a slot therein, a block pivotally mounted on one end of the said elongated plate, said block having a cavity in the under surface thereof and having a lock cylinder therein, and a clamp having a stud with a head on the outer end extended therefrom with the stud extended through the slot of the elongated plate and with the head thereof extended into the cavity in the under side of the said block, said lock cylinder having a lock bolt on the inner end and said lock bolt positioned to extend under the head of the stud of the said clamp for securing the parts in a locked position.

2. In a bicycle lock, the combination which comprises a clamp, a stud having a head on the outer end carried by the said clamp, an elongated plate having a slot therein positioned over the head of the said stud, a block pivotally mounted on the end of the elongated plate, said block having a cavity in the under surface and also having a lock cylinder therein and said block is positioned with the cavity in the under surface thereof extended over the head of the stud, and a lock bolt on the inner end of the lock cylinder positioned to coact with the head of the stud for securing the parts in assembled relation.

BRUCE McFALL.

REFERENCES CITED

The following references are of record in the file of this patent:

UNITED STATES PATENTS

| Number | Name | Date |
|---|---|---|
| 570,521 | Turton | Nov. 3, 1896 |
| 616,051 | Badoni | Dec. 13, 1898 |
| 1,114,585 | Craver | Oct. 20, 1914 |
| 2,232,310 | Boyler | Feb. 18, 1941 |